(12) United States Patent
Terada et al.

(10) Patent No.: US 6,279,413 B1
(45) Date of Patent: Aug. 28, 2001

(54) ARTICULATED ROBOT

(75) Inventors: Akihiro Terada, Fujiyoshida; Toshinari Tamura, Gotenba; Hisashi Ogawa; Takahiro Hase, both of Yamanashi, all of (JP)

(73) Assignee: Fanuc Ltd., Yamanashi (JP)

( * ) Notice: Subject to any disclaimer, the term of this patent is extended or adjusted under 35 U.S.C. 154(b) by 0 days.

(21) Appl. No.: 09/434,160

(22) Filed: Nov. 4, 1999

(30) Foreign Application Priority Data

Dec. 14, 1998 (JP) .................................................. 10-375056

(51) Int. Cl.[7] ............................. B25J 18/00; B25J 17/00
(52) U.S. Cl. ................................. 74/490.02; 74/490.03; 74/490.05; 414/917; 414/918; 901/28; 901/50
(58) Field of Search ......................... 74/490.02, 490.03, 74/490.05; 414/917, 918; 901/15, 28, 50

(56) References Cited

U.S. PATENT DOCUMENTS 5,375,480 * 12/1994 Nihei et al. ...................... 74/490.02
5,581,166 * 12/1996 Eismann et al. ................. 318/568.22
5,732,599 * 3/1998 Iriyama .............................. 74/490.02
5,949,209 * 9/1999 Okamoto et al. ..................... 318/563

FOREIGN PATENT DOCUMENTS

0593786A1   4/1994  (EP) .
07124887    5/1995  (EP) .
08281580   10/1996  (EP) .

* cited by examiner

Primary Examiner—Allan D. Herrmann
(74) Attorney, Agent, or Firm—Staas & Halsey, LLP

(57) ABSTRACT

A first arm (3) of a articulated robot has a double arm structure composed of a first arm piece (3a) and a second arm piece (3b). The first arm piece (3a) transmits a drive force, and a housing (4a) of a second arm (4) is rotatably mounted to the first arm piece (3a) at the end thereof. The second arm piece (3b) houses cables and pipes or the like, and a cover (4b) of the housing (4a) is rotatably mounted to the second arm piece at the end thereof. The cover (4b) is fixed to the housing (4a) through a fixing tool (6). The housing (4a) is permitted to be opened by separating the housing (4a) and the cover (4b) from each other by causing the second arm piece (3b) to rotate relatively to the first arm piece (3a) after the removal of the fixing tool (6).

2 Claims, 2 Drawing Sheets

ARTICULATED ROBOT

BACKGROUND OF THE INVENTION

1. Field of the Invention

This invention relates to a articulated robot, which has a robot arm of double arm structure composed of one arm piece formed as an endoskeletal arm to transmit a drive force and the other arm piece formed as an arm to house cables and pipes or the like and is available for an arc welding robot, a trimming robot, a handling robot or the like.

2. Description of the Prior Art

A articulated robot having a robot arm of double arm structure composed of one arm piece formed as an endoskeletal arm to transmit a drive force and the other arm piece formed as an arm to house cables and pipes or the like has been already known. A description will now be given of the well-known articulated robot having the robot arm of double arm structure with reference to FIGS. 3 and 4.

A base 1 is mounted with a turn portion 2 which turns about the center of axis perpendicular to a mounting surface (not shown) of the base 1. One end of a first arm piece 3a and that of a second arm piece 3b are fitted to the turn portion 2 so that these arm pieces 3a and 3b can rotate about the common axis perpendicular to the turning axis of the turn portion 2. The first arm piece 3a and the second arm piece 3b constitute a first robot arm 3 in double arm structure.

The first arm piece 3a, serving as one of the arms constituting the first robot arm 3, is of endoskeletal structure to transmit a drive force, and one end of the first arm piece 3a is rotatably fitted to the turn portion 2. On the other hand, the second arm piece 3b, serving as the other of the arms constituting the first robot arm 3, is of structure to house cables and pipes or the like, and one end of the second arm piece is rotatably supported by the turn portion 2.

A housing 4c is mounted to the other end of the first arm piece 3a and that of the second arm piece 3b so that the housing 4c can rotate about the common axis perpendicular to the center of turning axis of the turn portion 2. The housing 4c constitutes a second robot arm 4. A motor and a speed reducer (not shown) or the like for causing the second robot arm 4 to rotate relatively to the first robot arm 3, a motor and a speed reducer for causing a wrist 5, which will be later described, to rotate and air pipes and valves or the like for an end effector (not shown) are housed in the housing 4c.

The housing 4c is open at its top, and a cover 4d for covering an open portion of the housing is mounted to the housing 4c with a fixing tool such as bolts. Further, the wrist 5 adapted to mount the end effector thereto is connected to the housing 4c (the second robot arm 4).

When a drive source (not shown) to drive the turn portion 2 is operated to drive the turn portion 2, the turn portion 2 makes a pivotal motion about the axis perpendicular to the mounting surface of the base 1, and the first robot arm 3, the second robot arm 4 and the wrist 5 are also turned together with the turn portion 2. Further, when a drive source (not shown) to drive the first robot arm 3 is operated to drive the first arm piece 3a, the first arm piece 3a makes a pivotal motion relatively to the turn portion 2 to move the second robot arm 4. The second arm piece 3b is also rotatably moved whenever the first arm piece 3a is rotatably moved. The reason is that one end of the second arm piece 3b is rotatably supported by the turn portion 2, while the other end thereof is rotatably supported by the housing 4c (the second robot arm 4).

Further, when a drive source (not shown) to drive the second robot arm 4 is operated to drive the second robot arm 4, the second robot arm 4 makes a pivotal motion relatively to the first robot arm 3 (the first arm piece 3a and the second arm piece 3b).

In the articulated robot having the robot arm of double arm structure as described above, when maintenance of equipment such as the motors, the speed reducers and the valves housed in the housing 4c is carried out, there is a need for access to the equipment and parts inside the housing 4c as shown in FIG. 4 in the manner of removing the cover 4d and also a cover of the second arm piece 3b containing the cable and pipes. However, since only the upper surface of the housing 4c is opened, and cables and pipes are installed in the housing 4c, it is necessary to carry out maintenance of the equipment and parts contained in the housing 4c while operating cables and pipes in the uncovered second arm piece 3b, so that operability of the robot is degraded, making maintenance of the robot difficult.

Further, it may also be necessary to insert cables and pipes into the housing 4c when assembling the robot, and installation of the cover to the second arm piece 3b of the first robot arm 3, in which cables and pipes are arranged and installation of cables and pipes in the housing 4c can not be carried out concurrently with each other and in respective processes, resulting in the degradation in efficiency of production.

OBJECT AND SUMMARY OF THE INVENTION

An object of the present invention is to provide a articulated robot, which facilitates the maintenance of equipment and parts in a housing and is easily assembled.

For attaining the above object, according to the present invention, there is provided a articulated robot comprising a first robot arm of double arm structure in which a first arm piece formed as an endoskeletal arm to transmit a drive force is installed parallel to a second arm piece to house a cable or pipe, and a second robot arm having one end rotatably supported by the end of the first robot arm, wherein a housing of the second robot arm is rotatably supported by the end of the first arm piece, a cover of the housing of the second robot arm is rotatably supported by the end of the second arm piece, the cover is fixed to the housing through a fixing tool, and the housing is permitted to be opened by separating the housing and the cover from each other in the manner of causing the second arm piece to rotate relatively to the first arm piece after the removal of the fixing tool.

BRIEF DESCRIPTION OF THE DRAWINGS

The foregoing and other objects and features of the invention will become apparent from the following description of preferred embodiments of the invention with reference to the accompanying drawings, in which.

DETAILED DESCRIPTION OF THE PREFERRED EMBODIMENTS

Figure 1:
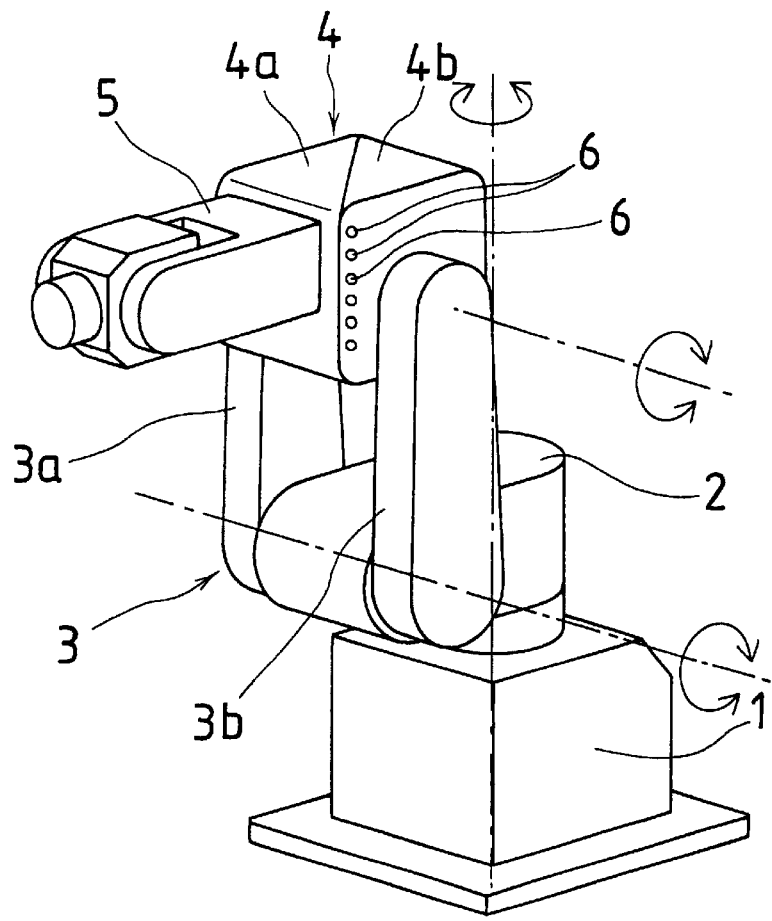
FIG. 1 is a perspective view showing one embodiment of a articulated robot having a double arm structure according to the present invention.
Figure 2:
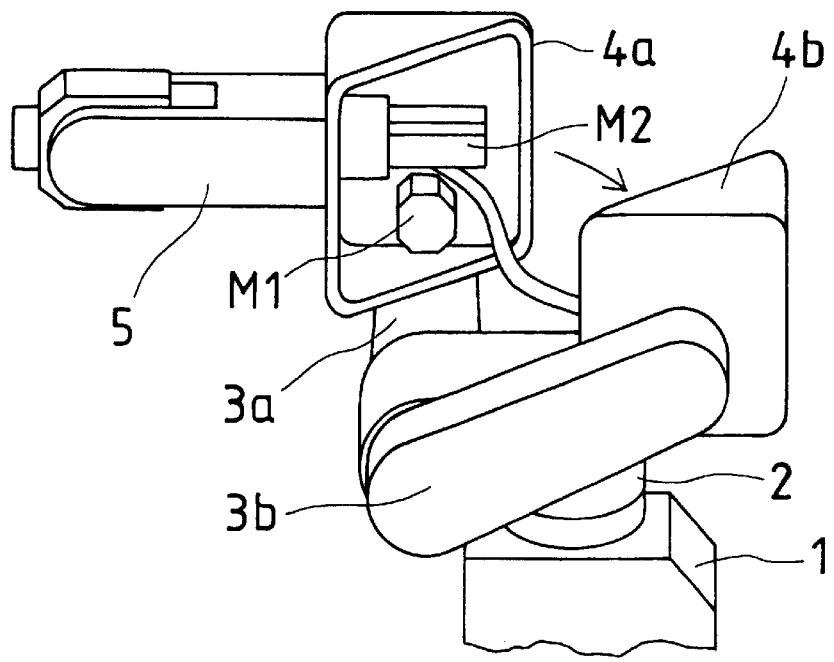
FIG. 2 is a view for explaining the opened state of a housing of the articulated robot of FIG. 1.
Figure 4:
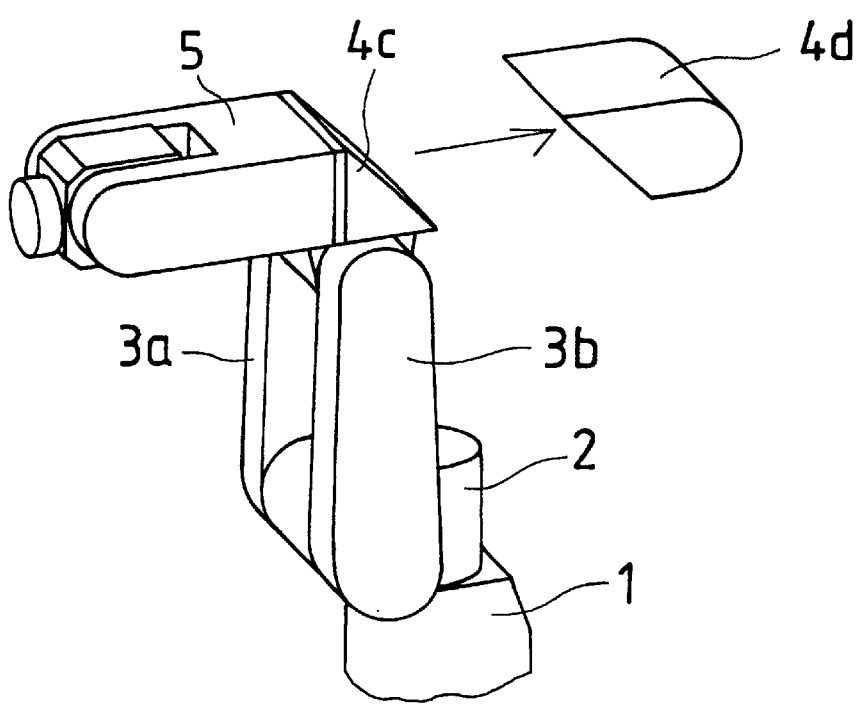
FIG. 4 is a view for explaining the opened state of a housing of the articulated robot of FIG. 3.

Hereinafter will be described an embodiment of a articulated robot according to the present invention with reference to FIGS. 1 and 2. In FIGS. 1 and 2, parts similar in constitution to those shown in FIG. 4 are denoted by the same reference numerals.

A base 1 is mounted with a turn portion 2 which turns about the axis perpendicular to a mounting surface (not shown) of the base 1. One end of a first arm piece 3a and that of a second arm piece 3b are fitted to the turn portion 2 so that the arm pieces 3a and 3b can rotate about the common axis perpendicular to the center of turning axis of the turn portion 2. The first arm piece 3a and the second arm piece 3b constitute a first robot arm 3 in double arm structure.

The first arm piece 3a, serving as one of the arms constituting the first robot arm 3, is of endoskeletal structure to transmit a drive force, and one end of the first arm piece 3a is rotatably fitted to the turn portion 2. On the other hand, the second arm piece 3b, serving as the other of the arms constituting the first robot arm 3, is of structure to house cables and pipes, and one end of the second arm piece is rotatably supported by the turn portion 2.

A housing 4a is mounted to the first arm piece 3a at the other end thereof so that it can rotate about an axis perpendicular to the turning axis of the turn portion 2. The housing 4a constitutes a second robot arm 4. A motor M1 and a speed reducer or the like for causing the second robot arm 4 to rotate relatively to the first robot arm 3, a motor M2 and a speed reducer for causing a wrist 5 to rotate, and cables, air pipes and valves or the like for an end effector are housed within the housing 4a. Incidentally, the structure thereof is equal to that of the prior art.

Figure 3:
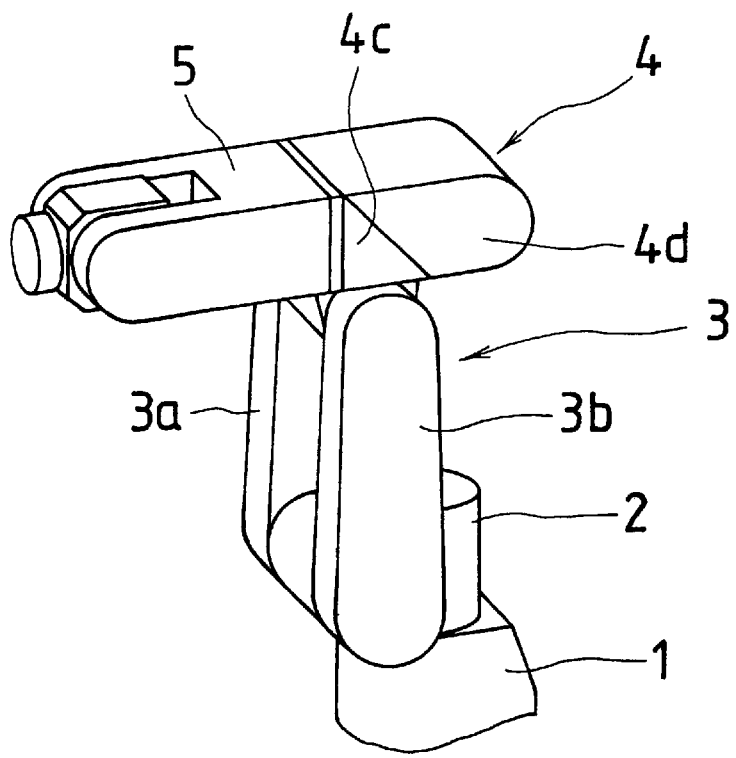
FIG. 3 is a perspective view showing a conventional articulated robot having a double arm structure.

This embodiment is different from the prior art shown in FIGS. 3 and 4 in that the open surface of the housing 4a of the second robot arm 4 according to this embodiment is formed to substantially face the second arm piece 3b. Then, a cover 4b for covering the open surface of the housing 4a is mounted to the housing 4a with a fixing tool 6 such as bolts.

As shown in FIG. 1, each of the housing 4a and the cover 4b has a shape like that resulting from longitudinally dividing a rectangular parallelepiped box into two parts along one of diagonal lines of a rectangular top surface of the rectangular parallelepiped box. Thus, the housing 4a and the cover 4b are combined together into a rectangular parallelepiped box. In other word, each of the housing and the cover is composed of upper and lower right-angled triangular plates, and two rectangular side plates each having sides equal in length to the sides making a right angle of each right-angled triangular plate. When the housing is covered with the cover, the housing and the cover takes the shape of a rectangular parallelepiped as a whole.

The cover 4b is rotatably supported by the second arm piece 3b. As shown in FIG. 1, when the cover 4b is fixed to the housing 4a through the fixing tool 6, the turning axis of the housing 4a relative to the first arm piece 3a is in alignment with the turning axis of the cover 4b relative to the second arm piece 3b.

Further, the wrist 5 adapted to mount an end effector to its end is connected to the housing 4a (the second robot arm 4), similarly to the case in the prior art.

When the turn portion 2 is caused to rotate relatively to the base 1, the first and second robot arms 3, 4 and the wrist 5 are also turned together with the turn portion 2. Further, when a drive source (not shown) to drive the first robot arm 3 is operated to drive the first arm piece 3a, the first arm piece 3a makes a pivotal motion relative to the turn portion 2 to move the second robot arm 4. Further, the second arm piece 3b is driven by the first arm piece 3a through the housing 4a and the cover 4b and makes a pivotal motion together with the first arm piece 3a. When the motor M1 to drive the second robot arm 4 is driven, the second robot arm 4 makes a pivotal motion relative to the first robot arm 3 (the first arm piece 3a and the second arm piece 3b).

The maintenance of equipment such as the motors M1, M2 and speed reducers and parts such as pipes and cables in the housing 4a is carried out by separating the cover 4b from the housing 4a in the manner of causing the second arm piece 3b to rotate relatively to the first arm piece 3a in the direction opposite to the wrist as shown in FIG. 2 after the removal of the fixing tool 6 such as bolts. Since the second arm piece 3b is only rotatably supported by the turn portion 2, it is possible to freely rotate the second arm piece 3b as shown in FIG. 2. The cover 4b is separated from the housing 4a by the pivotal motion of the second arm piece 3b to open the housing 4a.

According to the embodiment as described above, each of the housing 4a and the cover 4b has a shape like that resulting from longitudinally dividing the rectangular parallelepiped box into two parts along one of diagonal lines of the rectangular top surface, as shown in FIG. 1. Thus, since the rear surface (i.e., the side opposite to the wrist 5), the side surface (i.e., the side opposite to the second arm piece 3b), the half of the upper surface and that of the lower surface of the housing 4a are opened, access to the equipment and parts such as the motors, the speed reducers, the pipes, the cables and the valves housed within the housing 4a is easily made, thus resulting in ease in maintenance.

Besides, since the cables and the pipes are exposed to the outside when the housing 4a is opened, there is no need for removal of the second arm piece 3b for operation of the cables and pipes as in the case of the prior art, so that the need for disassembling work of the second arm piece 3b is eliminated to accordingly facilitate the maintenance. Further, in assembling the robot, step of installing the equipment and parts such as the motors M1, M2 and the speed reducers into the housing 4a and step of assembling the second arm piece 3b are carried out separately from each other, and thereafter the cables and pipes drawn out of the second arm piece 3b are connected to the equipment and parts in the housing 4a, thus, resulting in ease in assembling of the robot. Further, since the cover 4b is mounted to the second arm piece 3b, the second arm piece 3b fulfills a guide function to easily locate the cover 4b with respect to the housing 4a. Furthermore, since the partition surface between the housing 4a and the cover 4b may be formed as a plane, the packing or seal structure of the partition surface may be also easily constructed.

Incidentally, according to the embodiment, while each of the housing 4a and the cover 4b has the shape like that resulting from longitudinally dividing the rectangular parallelepiped box into two parts along one of diagonal lines of the rectangular top surface, it is to be understood that the housing and the cover are not limited to the above shape.

When a surface adapted to mount the wrist 5 is only available for the surface adapted to mount the equipment or the like housed in the housing 4a (the surface adapted to mount the first arm piece 3a is partially required), it is also useful to form the housing only by this surface, while using the other five surfaces (i.e., the upper surface, the lower surface, the opposite side surfaces and the rear surface) for the formation of the cover. Otherwise, the housing may be formed by the surface adapted to mount the wrist 5 and the side surface opposite to the second arm piece 3b or the bottom surface, while the other surfaces may be used for the formation of the cover. That is, the housing 4a may be formed at least by the surface adapted to mount the equipment or the like housed in the housing 4a, and the surfaces adapted to mount the wrist 5 and the first arm piece 3a, while the other surfaces may be used for the formation of the cover 4b so as to facilitate the access to the equipment in the housing 4a when the housing 4a is opened.

As has been described in the foregoing, according to the present invention, access to the equipment and the parts housed in the housing may be easily made without disassembling the robot arm or the like, and the maintenance of the equipment and parts described above may be facilitated. Further, the assemblage of the robot is also facilitated to simplify the production process, resulting in the improvement in productivity. Furthermore, since the partition surface between the housing and the cover may be formed as a plane, the packing and seal structure of the partition surface may be easily constructed. Moreover, since positioning of the cover to be done when the cover is mounted to the housing is made by being guided by the arm piece mounted with the cover, the cover can be easily positioned with respect to the housing.

What is claimed is:

1. A articulated robot, comprising:

a first robot arm of double arm structure in which a first arm piece formed as an endoskeletal arm to transmit a drive force is installed parallel to a second arm piece to house cables and/or pipes; and a second robot arm which is rotatably supported, at its one end, by said first robot arm at the end thereof;

wherein a housing of said second robot arm is rotatably supported by said first arm piece at the end thereof, a cover of the housing of said second robot arm is rotatably supported by said second arm piece at the end thereof, said cover is fixed to the housing through a fixing tool, and said housing is permitted to be opened by separating said housing and said cover from each other in the manner of causing said second arm piece to rotate relatively to said first arm piece after the removal of said fixing tool.

2. A articulated robot according to claim 1, wherein each of said housing and said cover is composed of upper and lower right-angled triangular plates, and two rectangular side plates each having one side equal to one of sides making a right angle of each right-angled triangular plate, and said housing and said cover take the shape of a rectangular parallelepiped as a whole when said housing is covered with said cover.

* * * * *

UNITED STATES PATENT AND TRADEMARK OFFICE
CERTIFICATE OF CORRECTION

PATENT NO. : 6,279,413 B1
DATED : August 28, 2001
INVENTOR(S) : Akihiro Terada et al.

It is certified that error appears in the above-identified patent and that said Letters Patent is hereby corrected as shown below:

Title page,
Item [57], ABSTRACT, line 1, change "a articulated" to -- an articulated --.

Column 2,
Lines 30-31, change "a articulated" to -- an articulated --.
Line 34, change "a articulated" to -- an articulated --.
Line 55, change "a articulated" to -- an articulated --.
Lines 66-67, change "a articulated" to -- an articulated --.

Column 5,
Line 24, change "A articulated" to -- An articulated --.

Column 6,
Line 17, change "A articulated" to -- An articulated --.

Signed and Sealed this

Twenty-sixth Day of March, 2002

*Attest:*

*Attesting Officer*

JAMES E. ROGAN
*Director of the United States Patent and Trademark Office*